United States Patent [19]

Moreau

[11] Patent Number: 4,953,501

[45] Date of Patent: Sep. 4, 1990

[54] FLOORING UNIT

[75] Inventor: Pierre A. Moreau, Calgary, Canada

[73] Assignee: BCM Manufacturing Ltd., Calgary, Canada

[21] Appl. No.: 327,838

[22] Filed: Mar. 23, 1989

[51] Int. Cl.⁵ .............................................. A01K 1/00
[52] U.S. Cl. ...................................................... 119/28
[58] Field of Search ...................... 119/28, 22; 52/177, 52/180, 181, 592

[56] References Cited

U.S. PATENT DOCUMENTS

| | | | |
|---|---|---|---|
| 2,689,366 | 9/1954 | Wichert | 52/180 |
| 3,274,743 | 9/1966 | Blum Jr. | 52/389 |
| 3,667,180 | 6/1972 | Tischuk | 52/598 |
| 3,875,901 | 4/1975 | Erickson et al. | 119/28 |
| 3,895,148 | 7/1975 | Chang | 52/592 |
| 3,921,350 | 11/1975 | Van Schoyck | 119/28 |
| 3,964,221 | 6/1976 | Berquist | 52/177 |
| 4,226,064 | 10/1980 | Kraayenhof | 52/180 |
| 4,242,390 | 12/1980 | Nemeth | 52/592 |
| 4,256,057 | 3/1981 | Herring | 119/28 |
| 4,329,939 | 5/1982 | Christie et al. | 119/28 |
| 4,362,128 | 12/1982 | Downey | 119/28 |
| 4,462,712 | 7/1984 | Penland Sr. | 52/581 |
| 4,468,910 | 9/1984 | Morrison | 52/177 |
| 4,675,222 | 6/1987 | Berndt Jr. | 52/181 |
| 4,845,907 | 7/1989 | Meek | 52/581 |

FOREIGN PATENT DOCUMENTS 2739898  3/1979  Fed. Rep. of Germany ........ 119/28

Primary Examiner—Paul J. Hirsch
Attorney, Agent, or Firm—Rogers, Bereskin & Parr

[57] ABSTRACT

A flooring unit for an animal enclosure such as a chicken coop or pen is disclosed. The unit is of relatively thin and flat rectangular shape overall and was a planar tread surface, two transverse elongate mounting members at respectively opposite ends and two longitudinal engagement members at respectively opposite sides of the unit moulding. A grid-like area is provided between the members and includes openings through which waste material can pass. The mounting members are designed to receive fastening elements such as screws for securing the unit to an underlying support. Also, they may be of L-shape in cross-section and are complementary to one another so that two similar floor units may be positioned end-to-end with respective, complementary mounting members fitted together. Fastening elements can then be driven through both mounting members and into the support. The engagement members are designed to engage a respective, corresponding engagement member of an adjacent moulding. Also, they may comprise portions of L-shape in cross-section alternating, along the length of the members, with portions of inverted L-shape and are complementary to one another so that two similar floor units may be positioned side-by-side with respective complementary engagement members fitted together.

19 Claims, 4 Drawing Sheets

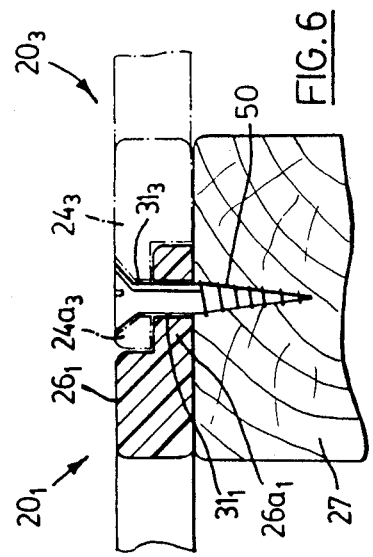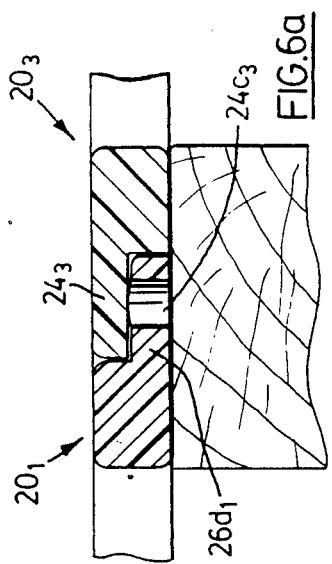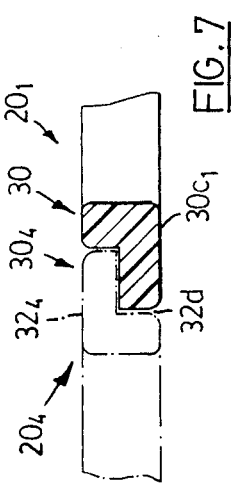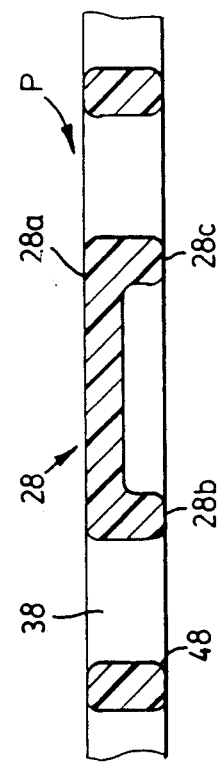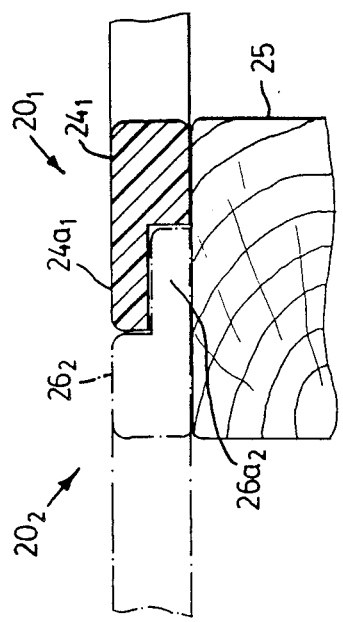

FLOORING UNIT

SUMMARY OF THE INVENTION

This invention relates generally to flooring for animal enclosures such as chicken pens and coops. For convenience, such flooring will hereinafter be referred to as chicken flooring although it is to be understood that the invention is not limited to this particular application.

BACKGROUND OF THE INVENTION

Chicken flooring has traditionally been made of wire mesh or from wooden or steel slats spaced from one another to allow droppings and other waste material to pass through the flooring. These traditional types of flooring have a number of serious disadvantages. One is that the animal droppings cause deterioration of the flooring; wire mesh or steel flooring members corrode rapidly while wooden members rot. Wooden flooring members also tend to encourage bacteria growth under the relatively moist conditions often found in a chicken coop or the like. Steel flooring has the further problem that heat is rapidly conducted away from the animals, which may affect their health, particularly where the flooring is used in a rearing pen for young animals.

Traditional flooring systems have the still further drawback that the flooring often cannot be readily repaired in localized areas which might be subjected to greater than average wear. For example, at an entrance to a pen, the flooring will often tend to wear more rapidly than elsewhere but, with traditional flooring, it is difficult to repair only the localized worn area. Rather, it may be necessary to replace the entire floor.

Proposals have been made to use modular plastic flooring units, for example in hog barns and other enclosures for relatively large animals. Our U.S. Pat. No. 4,329,939 discloses examples of modular flooring units of this type, designed primarily for hog barns. These units are relatively ruggedly constructed and, while they certainly could be used as chicken flooring, they are somewhat more substantial than would normally be required for this application.

SUMMARY OF THE INVENTION

According to one aspect of the present invention, there is provided a flooring unit of relatively thin and flat rectangular shape overall and which includes a planar tread surface, two transverse elongate mounting members, two longitudinal elongate engagement members and a grid-like area between the members having openings through which waste material can pass. The mounting members are disposed at respectively opposite ends of the unit. The cross-sectional shapes of the respective mounting members are complementary to one another so that two flooring units can be arranged end-to-end with respective complementary mounting members nested together. The cross-sectional shapes of the respective engagement member are also complementary to one another so that two flooring units can be arranged side-by-side with respective complementary engagement members engaging each other. The members at least hinder movement between the respective complementary members in at least one direction, the members being such that tread surfaces of adjacent flooring units form a continuous surface.

The mounting members may be adapted to receive fastening elements for securing the unit to an underlying support. Thus, when two flooring units are arranged end-to-end with respective complementary mounting members nested together, the members define a mounting area at which fastening elements can be driven through both members into a support.

Preferably, one of the mounting members is of L-shape in cross-section while the other is of inverted L-shape with the horizontal limbs of the L's defining said limbs.

By arranging for the mounting members of adjacent units to be nested one with the other, the units can be arranged so that the nested mounting members are centered directly over an underlying joist or other support. Thus an installer can be reasonably confident that all of the fastening elements will firmly engage the support. If the flooring units were simply butted together, not only would it be necessary to nail or otherwise fasten both abutting marginal portions of the respective supports, each by a row of fastening elements, but the rows would necessarily be spaced somewhat from one another with consequent risk that at least some of the elements might well miss or not properly engage the support. By way of illustration, such units would typically be nailed to the end edges of joists of 2" nominal width which means that the actual bearing surface of the joist for carrying the units would probably have an actual width of only 1 ¾".

Preferably also, the engagement members comprise portions of L-shape in cross-section alternating along the length of the member with portions of inverted L-shape and are complementary to each other.

By arranging for the engagement members of adjacent units to be engaged one with the other, adjacent units provide longitudinal support for one another. If the flooring units were simply butted together, the unsupported side edge of a unit supporting a load sufficient to deflect the unit from the normal flat shape would fall below a side edge of an adjacent unit to leave a raised edge which might trip an animal or person or a gap which could trap the foot of an animal or person.

BRIEF DESCRIPTION OF THE DRAWINGS

In order that this and other aspects of the invention may be more clearly understood, reference will now be made to the accompanying drawings which illustrate a preferred embodiment of the invention by way of example, and in which:

FIG. 4 is a sectional view on line 4—4 of FIG. 1;

FIG. 5 is a sectional view through the co-operating ends of the unit of FIG. 1 and a first further unit, taken generally on line 5—5 of FIG. 1;

FIG. 6 is a sectional view through the co-operating ends between the unit of FIG. 1 and a second further unit, taken generally on line 6—6 of FIG. 1;

FIG. 6a is a sectional view through the co-operating ends between the units of FIG. 4, taken generally on line 4a—4a of FIG. 1; and FIG. 7 is a sectional view through the co-operating sides of the unit of FIG. 1 and a third further unit, taken generally on line 7—7 of FIG. 1.

DETAILED DESCRIPTION OF THE PREFERRED EMBODIMENTS

Figure 1:
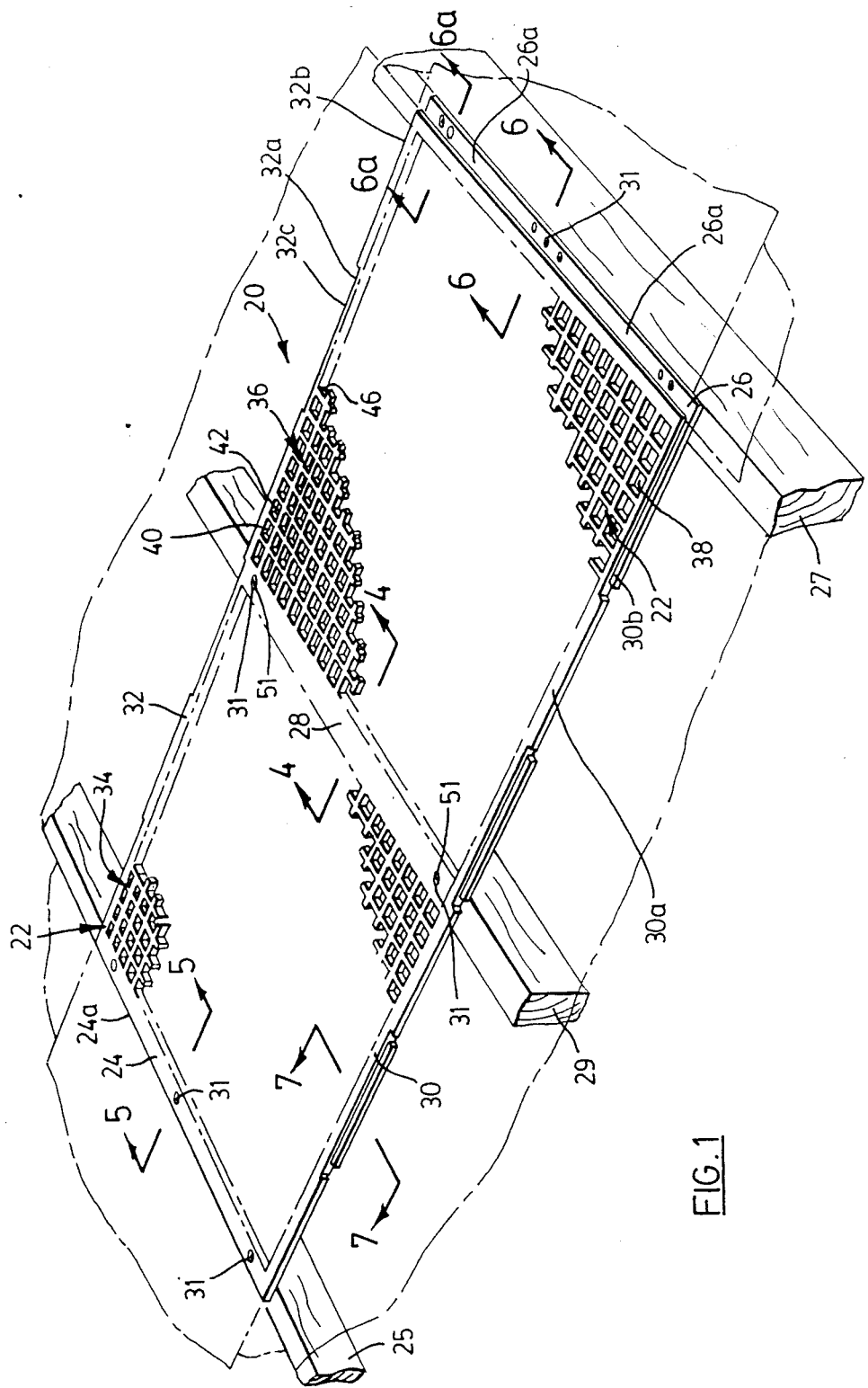
FIG. 1 is a perspective view of a flooring unit provided by the invention, and also showing three supporting joists.

Referring first to FIG. 1, a flooring unit in accordance with the invention is generally denoted by reference numeral 20 and is intended to be used with other similar flooring units to construct a flooring surface. Unit 20 has been designed specifically for use as chicken flooring (although as indicated previously, the invention is not limited to this particular application) and the unit is therefore of a relatively lightweight construction overall. By way of illustration, unit 20 has an overall length of 48", a width of 24" and an overall depth (dimension D in FIG. 4) of ⅜". This has been found to be a convenient "modular" size in that the individual units can be readily stored transported and handled but at the same time can conveniently be assembled together. The overall length of 48" allows the unit to be conveniently supported on joists at 24" centers.

Unit 20 is a structural foam moulding and in this particular embodiment is made of polypropylene. It has been found that, even given the relatively shallow depth D of the unit, the unit is quite rigid and exhibits significant resistance to bending about a transverse line, even when unsupported. When installed, the units provide a rigid and solid floor surface capable of supporting the weight of a person.

Referring now to the specific form of unit 20 in somewhat more detail, it will be seen that the moulding defines a tread surface generally denoted 22, which lies in a flat plane P (see FIG. 4). The moulding includes two elongate mounting members 24 and 26 at respectively opposite ends of the unit which have shapes which are complementary to each other so that two flooring units can be arranged end-to-end with complementary mounting members fitted together. The members 24 and 26 are adapted to receive fastening elements for securing the unit to an underlying support such as joists 25 and 27 as will be described. In this particular embodiment, the moulding also includes a third mounting member 28 which extends parallel to the members 24 and 26 generally centrally of the unit for location above a support, such as joist 29. All three mounting members are preformed with openings 31 through which fastening elements such as nails or screws can be driven to secure the unit to the support joists 25, 27 and 29. In other cases, these preformed openings could be omitted and the fastening elements simply forced through the mounting members at the required locations.

The mounting members 24 and 26 are 1 ⅜" in width while the center member 28 is 2" wide.

The moulding further includes two elongate engagement members 30 and 32 at respectively opposite sides of the unit and have shapes which are complementary to each other so that two flooring units can be arranged side-by-side with complementary members 30 and 32 fitted together.

Between the members 24, 26, 28, 30 and 32 are grid-like areas, generally denoted 34 and 36 which include square openings 38 through the moulding for permitting droppings and other waste material to fall through the flooring. It will be seen that the openings 38 are arranged side-by-side in rows 40 and 42 extending transversely and longitudinally of the unit with the openings separated from one another by transverse portions 44 of the moulding and by longitudinal portions 46 of the moulding. Again by way of illustration only, each of the openings 38 has a side length of ⅜". This particular size and configuration of openings has been found to be desirable for chicken flooring in that it provides adequate support for the chickens while allowing a relatively large total opening area for waste material to fall through the unit.

Referring now to FIG. 4, it will be seen that the portions of the moulding which define the sides of the openings 38 are rounded as indicated at 48 so as to minimize the risk of injury to a chicken whose foot might accidentally go through one of the openings 38.

Figure 2:
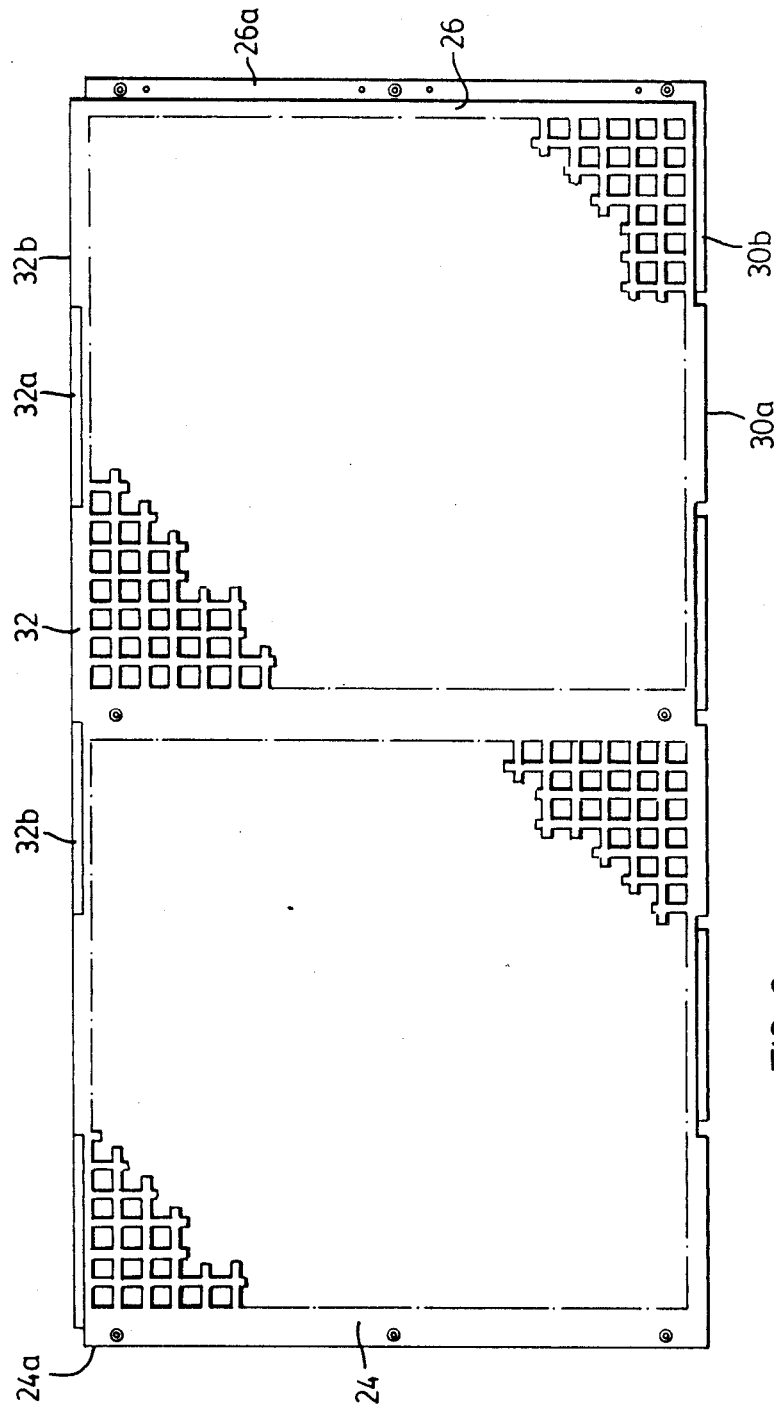
FIG. 2 is a plan view of the flooring unit of FIG. 1.
Figure 3:
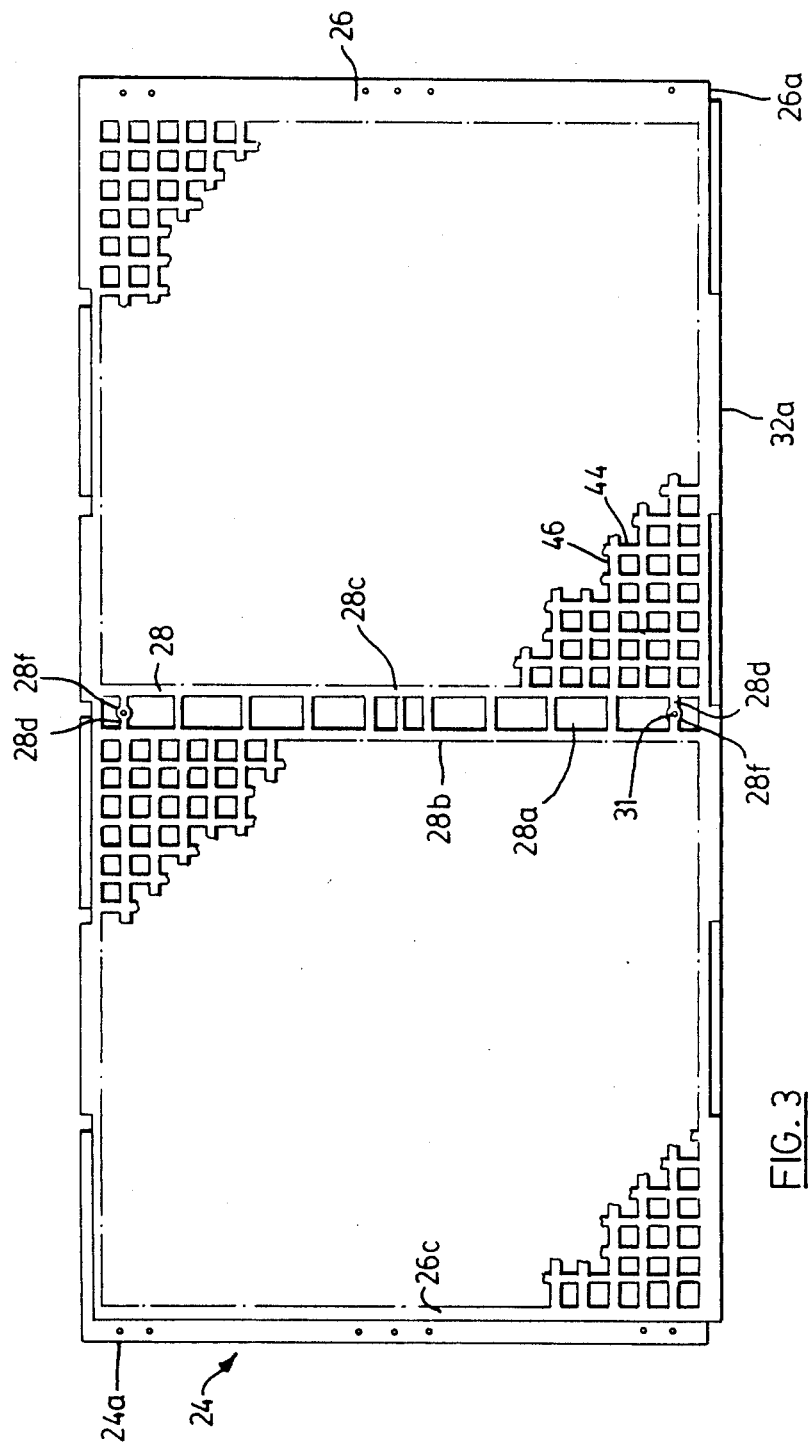
FIG. 3 is a view from below of the flooring unit of FIG. 1.

Referring back to FIG. 1, and also to FIGS. 2 and 3 the end mounting members 24 and 26 of the unit are each of a uniform cross-sectional shape throughout the length of the member and each include a limb, denoted 24a in the case of member 24 and 26a in the case of member 26, disposed parallel to the planar tread surface 22 of the unit. As mentioned previously, the cross-sectional shapes of the respective mounting members 24 and 26 are complementary to one another so that two flooring units can be arranged end-to-end with respective complementary mounting members nested together and together defining a mounting area at which fastening elements can be driven through both members and into a support therebelow.

FIG. 5 shows parts of two such mounting members nested together in this fashion and can be considered as showing a typical cross-section at the position at which the unit 20 of FIG. 1 and a further unit meet end-to-end.

In FIG. 5, opposed end portions of the two units are shown and are denoted respectively $20_1$ and $20_2$. The mounting members at the co-operating ends of the respective units are denoted respectively $24_1$ and $26_2$. It will be seen that the mounting members in this embodiment are generally L-shaped but are inverted with respect to one another with the limbs $24a_1$ and $26a_2$ defining the horizontal limbs of the respective L's. In FIG. 5, opposed end portions of the unit 20 of FIG. 1 and a second further unit, denoted $20_3$, are shown meeting end-to-end. The mounting members are denoted respectivey $26_1$ and $24_3$, and the limbs $26a_1$ and $24a_3$. FIGS. 4 and 5 clearly show that the limbs overlie one another when the mounting members are nested together so that a single fastening element such as the screw indicated at 50 in FIG. 5 can be driven downwardly through both mounting members and into the support joist 25 or 27 therebelow. Typically, this support will be a wooden joist as illustrated in FIG. 1, disposed on end and presenting a supporting surface of a width of, say, 1 ⅜" to the flooring. The arrangement provided by the invention ensures that the opposed ends of the flooring units $20_1$, $20_2$ and $20_3$ can be properly supported on a joist and that the fastening elements, as screw 50, can be expected with reasonable certainty to penetrate and securely hold in the joist. In this particular embodiment, the limbs of the mounting members $24a_1$ and $26a_2$, $26a_1$ and $24a_3$, are provided with apertures $29_1$ and $29_3$ to receive fastening elements, and it will be seen that the aperture $29_3$ on the uppermost limb $24a_3$ is countersunk such that the head of the screw 50 lies flush with the top surface of the unit.

FIG. 6a shows the opposed end portions of FIG. 6 at a different section and illustrates a projection $24c_3$ and corresponding recess $26d_1$ which engage to locate the ends of the units $20_1$ and $20_3$ relative to each other. The projection $24c_3$ and recess $26d_1$ are circular in cross-section, and four such projections $24c$ and recesses $26d$ are provided in each mounting member 24 and 26, as seen in FIGS. 1, 2 and 3.

FIGS. 5 and 6a also illustrate the fact that, in this particular embodiment, the mounting member which is of inverted L-shape in section (member $24_1$ in FIG. 4, member $24_3$ in FIGS. 5 and 5a, and 24 in FIG. 1) defines an upper surface which is in the plane P of the tread surface so that the overall surface of a flooring assembled from end-to-end units 20 is planar. At the same time, the overlapping limbs $24a_1$ and $26a_2$ are each of a thickness equal to half the overall depth (D-FIG. 4) of the unit itself so that the two limbs together occupy the same vertical height as the thickness of the unit. This ensures that the units will be evenly supported and that the tread surface of the flooring will be horizontal and even provided the supporting surfaces of the underlying joists are properly levelled.

Several such supporting joists 25, 27 and 29 are shown in FIG. 1 and it will be seen that the joists extend parallel to one another in a direction normal to the lengths of the installed units 20. The joists 25, 27 and 29 are spaced on 28" centers so that one joist will be disposed below each of the mounting members 24, 26 and 28 of the flooring unit. In some cases, it may be possible to omit the joist 29 below the center mounting member 28, and even omit the member itself from the moulding. However, supports on 24" centers are desirable where the flooring may be required to support the weight of a person.

The center mounting member 28 is itself of generally inverted u-shape in cross-section as can be seen from FIGS. 3 and 4 and comprises a flat elongate top portion 28a of a thickness equal to the thickness of the limbs 24a and 26a of the end mounting members, and two vertical, transverse reinforcing webs 28b and 28c which terminate at a level even with the bottom surfaces of the transverse and longitudinal portions 44 and 46. Longitudinal reinforcing webs 28d extend between the webs 28b and 26c. The openings 29 in member 28 extend through the two outermost webs 28d and are provided with integral sleeves 28f to provide some resistance to compression when fastening elements 51 (see FIG. 1) inserted through the openings 29 are tightened.

While the ends of the unit are located by means of the mounting members, the sides of adjacent units are located relative to each other by the engagement members. Referring back to FIGS. 1, 2 and 3, each side engagement member 30 and 32 includes three respective first and second limbs, 30a and 30b, and 32a and 32b, disposed parallel to the planar tread surface of the unit. As mentioned previously, the cross-sectional shapes of the respective engagement members 30 and 32 are complementary to one another so that two flooring units can be arranged side-by-side with respective complementary engagement members fitted together.

FIG. 7 shows parts of two such engagement members engaged in this fashion and can be considered as showing a typical cross-section at the position at which the unit of FIG. 1 a further unit meet side-by-side.

In FIG. 7, opposed side portions of the two units are shown and the units are denoted respetively $20_1$ and $20_4$. The engagement members at the co-operating sides of the respective units are denoted respectively $30_1$ and $30_4$. It will be seen from FIGS. 1 to 3 that the engagement members in this embodiment comprise alternating generally L-shaped portions arranged to be inverted with respect to the corresponding portion of an adjacent unit with the limbs 30a, 30b, 32a and 32b (FIG. 1) defining the horizontal limbs of the respective L's. In the example illustrated, each side is provided with three L-shaped portions, and three inverted L-shaped portions. In one engagement member 32, the limbs 32a and 32b overlap such that the portions define a total of six first and second recesses 32c and 32d on alternate sides of the unit. The limbs 30a and 30b of the other engagement member 30 are spaced from one another such that these limbs 30a and 30b are complementary to the corresponding recesses 32c and 32d and fit snugly therein.

FIG. 7 illustrates the fact that, in this particular embodiment, the portions of the engagement members 30 and 32 which are of inverted L-shape in section define an upper surface which is in the plane P of the tread surface so that the overall surface of a flooring assembled from units 20 is planar. At the same time, the overlapping limbs are each of a thickness equal to half the overall depth (D-FIG. 4) of the unit itself. Thus, the engagement members 30 and 32 serve to locate side-by-side units relative to one another, and allow one unit to provide support for an adjacent load-bearing unit.

As indicated previously, unit 20 is a one-piece structural foam moulding. The technique of forming such a moulding is well-known and involves the introduction of a foaming agent into a raw resin of a plastic material to form the cell structure of the foam. Baking powder can be used as the foaming agent in conjunction with polypropylene resin. Although other forms of moulding could be used, structural foam moulding has a number of advantages compared with other techniques. The resulting product has high strength and good heat insulation properties, results in a relatively light-weight product and is economical in terms of the plastic material used. Polypropylene is believed to be the preferred plastic material and has the advantage that the flooring unit will readily return to its original shape after deformation. Polyethylene may also be used although with some increase in weight, to compensate for inferior creep properties.

It should finally be noted that the preceding description relates to a particular preferred embodiment of the invention only and that many modifications are possible within the broad scope of the invention, in addition to those indicated previously. For example, the particular overall dimensions of the unit and the shape, size and arrangement of the openings 36 may vary. Further, it is possible to provide units without mounting members such that units arranged end to end will simply abut one another along a vertical surface. In such cases, the ends of the units will still be provided with apertures to receive screws for securing the unit to an underlying supporting joist.

Throughout the description and claims the mounting members and engagement members are described as being located on the ends and sides of the unit, respectively. This is solely for clarity of description, and is not intended to limit the scope of the invention, as clearly the mounting members and engagement members will operate satisfactorily when located at either the sides or ends of the unit.

I claim:

1. A flooring unit for an animal enclosure, being of relatively thin and flat rectangular shape overall for mounting between substantially parallel joist means and defining:
   a planar tread surface;
   two elongated mounting members being disposed at respectively opposite ends of the unit and extending over substantially the entire width of the unit, each mounting member including a portion adapted to overlap a corresponding portion of a complementary mounting member whereby two flooring units can be arranged end-to-end with complementary mounting members fitted together and overlapping one another to define a mounting area, each mounting member including fastener receiving means, the fastener receiving means being located such that when a portion of a mounting member overlaps a corresponding portion of a complementary mounting member the fastener receiving means of the portions are aligned to receive a single fastening element to be driven into a joist means therebelow;

two elongate engagement members disposed at opposite sides of the unit and having shapes which are complementary to each other so that two flooring units can be arranged side-by-side with the complementary engagement members fitted together; and a grid-like area between said member including openings through which waste material can pass.

2. A flooring unit for an animal enclosure, being of relatively thin and rectangular flat shape overall for mounting between substantially parallel joist means and defining:

a planar tread surface;

two elongate mounting members adapted for receiving fastening elements for securing the unit to underlying joist means, said mounting members extending transversely of the unit over at least substantially the entire width thereof and being disposed at respectively opposite ends of the unit and having shapes which are complementary to one another so that two flooring units can be arranged end-to-end above a joist means;

two elongate engagement members extending longitudinally of the unit over at least substantially the entire length thereof and being disposed at respectively opposite sides of the unit and including respective first and second portions adapted to respectively underlie and overlap second and first portions of an adjacent complementary engagement member, the first portion of each said engagement member being L-shaped in cross-section and the second portion being of inverted L-shape in cross-sections whereby two flooring units can be arranged side-by-side with complementary engagement members fitted together; and a grid-like area between said members including openings through which waste material can pass.

3. A flooring unit as claimed in claim 1, wherein one of said mounting members is L-shaped in cross-section and the other is of inverted L-shape in cross-section.

4. A flooring unit as claimed in claim 3, wherein said other mounting member which is of inverted L-shape in cross-section defines a top surface disposed in the plane of said tread surface.

5. A flooring unit as claimed in claim 4 which defines a planar bottom surface parallel to said tread surface and spaced therefrom by a constant dimension D corresponding to the overall thickness of the unit.

6. A flooring unit as claimed in claim 1, 3, 4 or 5 wherein one of said mounting members includes projections and the other of said mounting members includes recesses for receiving the projections of an adjacent complementary mounting member to prevent relative lateral movement between the mounting members.

7. A flooring unit as claimed in claim 1 which further defines a third mounting member extending parallel to said end mounting members generally centrally of the length of the unit, said third mounting member being adapted to receive fastening elements for securing the unit to an underlying just means and the flooring unit thus defining two respective grid-like areas on opposite sides of said third mounting member.

8. A flooring unit as claimed in claim 1, 2 or 7 wherein each of said mounting members includes preformed openings for receiving fastening elements.

9. A floor unit as claimed in claim 1, wherein the engagement members extend over substantially the entire length of the unit.

10. A flooring unit as claimed in claim 9, wherein each engagement member includes respective first and second portions respectively adapted to underlie and to overlap second and first portions of an adjacent complementary engagement member, whereby, two said flooring units can be arranged side-by-side with complementary engagement members fitted together.

11. A flooring unit as claimed in claim 10, wherein the first portion of each said engagement member is L-shaped in cross-section and the second portion is of inverted L-shape in cross-section.

12. A flooring unit as claimed in claim 11, wherein the ends of the first and second portions of a first engagement member on one side of the unit overlap such that said portions define respective first and second recesses, and the ends of the first and second portions of a second engagement member on the other side of the unit are spaced from one another such that said portions are complementary to the respective second and first recesses in the first engagement member of an adjacent unit.

13. A flooring unit as claimed in claim 12, wherein each engagement member is provided with a plurality of said first and second portions alternating along the length of the member.

14. A flooring unit as claimed in claim 13, wherein each engagement member is provided with three each of said first and second portions.

15. A flooring unit as claimed in claim 13, wherein said second portion of each engagement member which is of inverted L-shape in cross-section defines a top surface disposed in the plane of said tread surface.

16. A flooring unit as claimed in claim 2, wherein the ends of the first and second portions of a first engagement member on one side of the unit overlap such that said portions define respective first and second recesses, and the ends of the first and second portions of a second engagement member on the other side of the unit are spaced from one another such that said portions are complementary to the respective second and first recesses in the first engagement member of an adjacent unit.

17. A flooring unit as claimed in claim 1, 2, 7 or 10 wherein said openings in the grid-like area are of rectangular shape and are arranged in a plurality of rows extending transversely of the unit in which the openings are positioned side-by-side in each row and are separated from one another by longitudinal portions of said tread surface, with the openings in each row aligned with openings in adjacent rows in the longitudinal direction of the unit and separated by transverse portion of said tread surface.

18. A flooring unit as claimed in claim 1, 2 7 or 10 wherein the flooring unit is formed of a unitary plastic moulding in a rigid plastic material substantially unaffected by animal droppings.

19. A flooring unit as claimed in claim 18, wherein said mounting is a structural foam moulding.

* * * * *